(12) United States Patent
Wepiwe et al.

(10) Patent No.: US 7,660,320 B2
(45) Date of Patent: Feb. 9, 2010

(54) COMMUNICATION NETWORK, A METHOD OF ROUTING DATA PACKETS IN SUCH COMMUNICATION NETWORK AND A METHOD OF LOCATING AND SECURING DATA OF A DESIRED RESOURCE IN SUCH COMMUNICATION NETWORK

(75) Inventors: Giscard Wepiwe, Berlin (DE); Plamen L. Simeonov, Berlin (DE)

(73) Assignee: Technische Universitat Berlin, Berlin (DE)

( * ) Notice: Subject to any disclaimer, the term of this patent is extended or adjusted under 35 U.S.C. 154(b) by 129 days.

(21) Appl. No.: 11/989,452

(22) PCT Filed: Jul. 26, 2006

(86) PCT No.: PCT/EP2006/007582
§ 371 (c)(1),
(2), (4) Date: Mar. 11, 2008

(87) PCT Pub. No.: WO2007/014745
PCT Pub. Date: Feb. 8, 2007

(65) Prior Publication Data
US 2009/0092144 A1    Apr. 9, 2009

(30) Foreign Application Priority Data
Jul. 28, 2005    (EP)    ................ 05090225

(51) Int. Cl.
H04L 12/28    (2006.01)

(52) U.S. Cl. .................................................... 370/406
(58) Field of Classification Search .................. 370/406
See application file for complete search history.

(56) References Cited

OTHER PUBLICATIONS

International Search Report, dated Oct. 19, 2006, corresponding to PCT/EP2006/007582.

(Continued)

*Primary Examiner*—Ayaz R Sheikh
*Assistant Examiner*—Nicholas Sloms
(74) *Attorney, Agent, or Firm*—Christie, Parker & Hale, LLP (57) ABSTRACT

A communication network comprising a plurality of network nodes is provided, wherein the network nodes are logically arranged to form a plurality of concentric rings, all rings except the outermost ring being with high probability fully constructed; the number of nodes on each fully constructed ring being $d^D$, wherein d denotes the base of an integer having D digits, $D \geq 1$, and wherein D also denotes the ring number, D starting with the value 1 for the innermost ring; each node being identified by an identification number unique in the network, said identification number having D digits, $D \geq 1$, and D denoting the ring number on which the node is located, and the value of each digit being between 0 and d−1; and each node of a given fully constructed ring is allowed to route data packets to one node in the next inner ring, to d nodes in the next outer ring, if the next outer ring is fully constructed, and to at least d nodes on the same ring. The invention further regards a method of locating and securing data of a desired resource in such communication network and a method of locating and securing data of a desired resource in such communication network.

17 Claims, 8 Drawing Sheets

OTHER PUBLICATIONS

Mislove, et al., "Providing Administrative Control and Autonomy in Structured Peer-to-Peer Overlays," 2004, pp. 1-6, Rice University, Houston, TX, XP-002389577.

Stoica, et al., "Chord: A Scalable Peer-to-Peer Lookup Protocol for Internet Applications," IEEE/ACM Transactions on Networking, vol. 11, No. 1, Feb. 2003, pp. 17-32, XP001144289.

Datta, et al., "On de Bruijn routing in distributed hash tables: There and back again," Proceedings of the Fourth International Conference on Peer-to-Peer Computing, Aug. 25, 2004, pp. 159-166, XP010724979.

Liu, "Optimal Routing in the De Bruijn Networks," IEEE, Proceedings of the International Conference on Distributed Computing Systems, May 28 to Jun. 1, 1990, pp. 537-544, XP010019300.

Bhandari, "Optimal Physical Diversity Algorithms and Survivable Networks," IEEE, Computers and Communications, Jul. 1, 1997, pp. 433-441, XP010241387.

Stoica, et al., "Chord: A Scalable Peer-to-Peer Lookup Protocol for Internet Applications," SIGCOMM Comput. Commun. Rev., 31(4) pp. 1-12, 2001.

N.G de Bruijn: A Combinatorial problem, In Nederl. Adad. Wetensh. Proc. 49, pp. 768-764, 1946 (On Order).

English translation of International Preliminary Examination Report fo corresponding PCT application No. PCT/EP2006/007582, dated Jan. 29, 2008.

N.G. de Bruijn (Communicated by Prof. W. Van Der Woude): A Combinatorial problem, In Nederl. Adad. Wetensh. Proc. 49, pp. 758-764.

| Routing Table for Node with ID = 1000 | | | |
|---|---|---|---|
| List_1: De Bruijn Neighbors | | List_2: Head + Outer+Inner Neighbors | |
| NodeId | IP-Address | NodeId | IP-Address |
| 0000 | A.B.C.D | 10001 | I.J.K.L |
| 0001 | E.F.G.H | 10000 | M.N.O.P |
| | | 100 | X.P.L.M |
| | | 0100 | P.O.L.Y |

| Location Table for Node with ID = 1000 | |
|---|---|
| GUIDE | Provider's IP-Address |
| 100010...1100101 | A.C.D.E |
| 100011...0110110 | D.X.K.L |
| 100001...1011000 | S.T.L.A |
| 1000011...111111 | L.I.O.N |

```
/**Route from x to y
 * Inputs: x = source, y = destination
 * Outputs: the next hop on the
 * way between x and y
 **/
route(x,y) {
    /* function ring(x) returns the actual
        ring number for node x. ring(0)=ring
        (1)=1 */
    if (ring(x) == ring(y)) {
        if (ring(x) == D_max) {
            /* Check whether the nodes are on
                the outermost ring */
            return in_forwarding(x, y);
        } else {
            /* The nodes are on a lower fully
                constructed ring */
            return horizontal_routing(x,y);
        }
    } else if (ring(x) < ring(y)) {
        if (prefix(y) == x) {
            return out_forwarding();
        } else {
            return horizontal_forwarding(x, y)
            ;
        }
    } else if (ring(x) > ring (y) {
        return in_forwarding(x, y);
    }
}
/**
 * Inputs: x = source; y = destination;
 * Outputs: return the next-hop on
 * the way between x and y:
 **/
out_forwarding(x, y) {
    int D = ring(x) + 1; /* the number of the
        outer ring from x*/
    return (y modulo (d power D));
} in_forwarding(x,y) {
    int D = ring(x) - 1; /* the number of the
        inner ring from x */
    return (y modulo (d power D));
} horizontal_forwarding(x, y, i){
    int d; /* the constant degree of the De
        Bruijn graph for the x's ring */
    int N; /* The number of nodes on the ring
        */
    k = top(y, i); /* The i-th letter of y
        counted from left */
    i++;
    return (dx + k) modulo N;
}
```

COMMUNICATION NETWORK, A METHOD OF ROUTING DATA PACKETS IN SUCH COMMUNICATION NETWORK AND A METHOD OF LOCATING AND SECURING DATA OF A DESIRED RESOURCE IN SUCH COMMUNICATION NETWORK

CROSS-REFERENCE TO A RELATED APPLICATION

This application is a National Phase Patent Application of International Patent Application No. PCT/EP2006/007582, filed on Jul. 26, 2006, which claims priority of European Patent Application No. 05090225.3, filed on Jul. 28, 2005.

BACKGROUND

The invention regards a communication network with a plurality of network nodes, a method of routing data packets in such communication network and a method of locating and securing data of a desired resource in such communication network. More particularly, the invention regards a communication network and methods for efficient and effective distribution and discovery of recources in large-scale dynamic distributed environments, in particular peer-to-peer systems.

Peer-to-peer (P2P) systems are dynamic distributed systems in which nodes of equal roles and capabilities exchange information and services directly with each other. Due to its main design principle of being completely decentralized and self organizing—opposed to the Internet's "traditional" Client-Server paradigm—the P2P-concept emerges to a major design pattern for future applications, system components and infrastructural services, particularly with regard to reliability and resilience.

The Napster network is an example of P2P system, which emerged very fast as a content sharing infrastructure (mainly for MP3 music) among a geographically distributed user community. Other popular examples are Gnutella and Fast Track.

However, as P2P file sharing systems become increasingly popular, scalability and resilience have been recognized as the central challenge in designing such systems. For instance, Napster uses centralized directory service, which represents a single point of failure. Systems based on Gnutella use flooding to avoid the problem of Napster, but flooding is known to be highly bandwidth consuming. Furthermore deletion of a node or a group of nodes in a large P2P network may cause disconnection of a node or a subset of nodes from the network. Hence, maintaining the network always connected may imply an active or reactive exchanging of control information, which may also be bandwidth-consuming.

Therefore, FastTrack proposes an improvement to Gnutella's flooding, by introducing the notion of nodes differentiation. Resource query messages are not flooded to all the nodes in the network. FastTrack defines some nodes as "supernodes", which are mostly fast computers with large computing resources, acting as temporally indexing server for other eventual slower nodes. Discovery messages are routed only through supernodes who are more susceptible to know the location of a requesting resource. FastTrack uses a kind of "structured" flooding, whereas it can not be guaranteed that a resource provider will be found even if available in the network; moreover, protocols such as FastTrack and Gnutella do not allow an uniform or consistent distribution of resources among nodes.

A series of P2P protocols such named Chord, Tapestry, Pastry, CAN, Viceroy, ODRI, CAN-D2B, distance halving, Broose, Koorde and Pagoda have been deployed recently in the research community, which are based on application layer overlay networking construction, to address the problem of routing and lookup efficiency as well as the resilience issue during network churns. The minimum value of the resource lookup distance in such networks generally varies between $\log_d N$ and $\log N$, N denoting the total number of nodes in a network, and d denoting the degree of a network, the degree being defined as the maximal number of outgoing links that is maintained by any node in the network.

Ion Stoica, Robert Morris, David Karger, M. Frans Kaashoek, and Hari Balakrishnan: Chord: A scalable peer-to-peer lookup service for internet applications, SIGCOMM Comput. Commun. Rev., 31(4):149-160, 2001, describe a peer-to-peer network in which a key identifying a resource or desired data item is mapped onto a network node.

N. G. de Bruijn: A combinatorial problem, In Nederl. Akad. Wetensh. Proc. 49, pages 768-764, 1946, describes now called De Bruijn digraphs which are usually defined as directed graphs that are constructed on an alphabet. The vertices of the graphs are the words of this alphabet. A vertex is formed of D letters chosen from a set with cardinality d.

Figure 10:
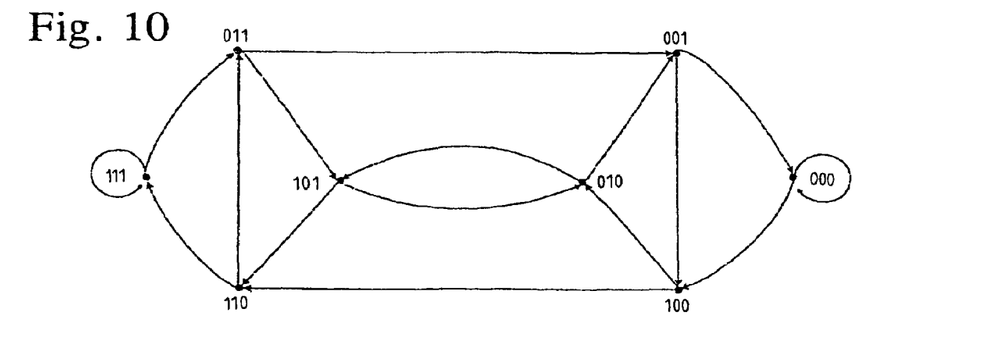
FIG. 10 shows a B (2, 3) De Brujn Graph example known in the art.

Per definition, a B (d, D) De Bruijn network forms a network of size $N=d^D$. FIG. 10 illustrates an example of a B (2, 3) static the De Bruijn network with 8 nodes. Analysis of the De Bruijn graphs in the literature have shown interesting properties for their applications in static interconnected networks. Thereafter, each node in the network has exactly a constant number d of incoming and outgoing edges. That is, the routing table size of nodes in the network is constant. Moreover, there exists a path of length $D=\log_d N$ hops between any two nodes in the network. Studies on the connectivity of the De Bruijn networks show that at most d−1 nodes can fail without disconnecting any node or any set of nodes from the network. Hence, the degree d is an important design parameter that can be varied to improve connectivity.

Figure 11:
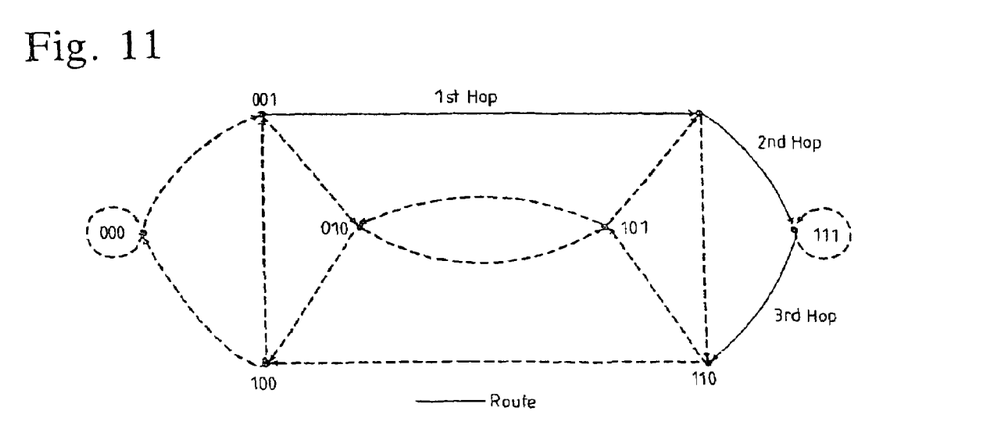
FIG. 11 shows an example of message routing from node x=001 to node y=110 in the De Brujn Graph example of FIG. 10.

The lookup operation for a resource R in a De Bruijn network is equivalent to the routing operation from a node x to a node y=prefix (R), which eventually knows a provider of resource R. The pseudo-function prefix ( ) returns as result the k first elements right from R, with k≦D. Routing is achieved by a consecutive left shifting of x with R until a node y is reached. The left shifting operation on the node x results in a node y=kx+i mod N, i=topLetter (R, k), where topLetter (R, k) is a function that returns the $k^{th}$ letter from left of resource ID R and where k is the covered distance from the source. At any node x, a next-hop node y is chosen after left shifting of x so that y is a neighbor of x. Thus, routing in this way in the De Bruijn graph needs at most D hops from source to destination. For example, in FIG. 10 the message routing from 001 to 110 takes the path 001−>011−>111−>110 as depicted in FIG. 11.

There is a need to provide for an improved communication network and methods to route and locate information therein.

SUMMARY

In one embodiment, it is provided a communication network comprising a plurality of network nodes; wherein
the network nodes are logically arranged to form a plurality of concentric rings, all rings except the outermost ring being with high probability fully constructed;
the number of nodes on each fully constructed ring being $d^D$, wherein d denotes the base of an integer having D digits, D≧1, and wherein D also denotes the ring number, D starting with the value 1 for the innermost ring;

each node being identified by an identification number unique in the network, said identification number having D digits, $D \geq 1$, and D denoting the ring number on which the node is located, and the value of each digit being between 0 and d−1; and each node of a given fully constructed ring is allowed to route data packets to one node in the next inner ring, to d nodes in the next outer ring, if the next outer ring is fully constructed, and to at least d nodes on the same ring.

d can also be regarded to represent the degree of the network and D can also be regarded to represent the diameter of the network.

The inventive network is an overlay network based on a concentric multi-ring topology, which enables resource lookup in dynamic distributed system like P2P in at most $D_{HiPeer} = \log_d (N(d-1)+d) - 1$ hops, where $D_{HiPeer}$ is the network diameter, d is the node's degree (in particular the degree of a De Brujn network formed by a ring) and N is the total number of nodes in the network. Thus, it is achieved a highly reliable network of independent peers that will be referred to as HiPeer.

It is pointed out that the inventive network is a logical network and does not describe the physical arrangement of network nodes. In practice, the network nodes will be computers located at user premises and connected via the internet.

In an embodiment, each ring of the network is logically so constructed that the nodes on a fully constructed ring form a (d, D) De Brujn network. Routing between nodes on such ring is carried out to De Brujn neighbours as is known in the art.

In a further embodiment, the network further comprises computing means initiating a stabilization routine on a finite portion of the network when a node on an inner ring leaves the network, the stabilization routine logically rearranging some of the nodes such that they change their logical ring in a manner that, at the end of the routine, all rings except the outermost ring are fully constructed again.

Regarding the joining of a node, there is provided computing means placing a node joining the network on the outermost ring and assigning a unique identification number, and, if the outermost ring is already fully constructed, creating a new outermost ring and placing the joining node on the new outermost ring.

The network management costs at a high rate of node "join and leave" in such dynamic distributed network environment is of deterministic magnitude order O(d), with each node needing only at most 2d+2 finger entries even in churn situation.

In one embodiment, a node joining the network divides the current largest space between any two nodes in the outermost ring in two spaces of equal size. This ensures an even distribution of keys at all times in the system, the distance between any two neighboring nodes on the rings being as equal as possible.

In a further embodiment, the first node of a new outermost ring is assigned an identification number consisting of $D_{max}$ digits of value zero, $D_{max} \geq 1$, where $D_{max}$ denotes the ring number of the outermost ring. Said first node represents a ring contact node. Said ring contact node of a new outermost ring is present as long as this ring is present. Such ring contact node of a new outermost ring represents a contact point for any node wishing to join the network.

It shall be considered that a node on a given fully constructed ring has the identification number $x_{D-1}x_{D-2} \ldots x_1x_0$, with $x_i$ being a digit between 0 and d−1, and D denoting the number of the ring on which the given node is located. For example, the identification number ID of a node is 101, with d=2. In one embodiment, the node is allowed to route data packets to the one node in the next inner ring which has the identicication number $x_{D-1}x_{D-2} \ldots x_1$, i.e. the node in the next inner ring which is identical in its first D−1 digits (in the example: to node with ID 10), to those d nodes in the next outer ring which have the identification number $x_{D-1}x_{D-2} \ldots x_1x_0\beta$, wherein $\beta$ is a digit between 0 and d−1, i.e. to nodes on the next outer ring which are identical in their first D digits (in the example: to nodes with IDs 1010 and 1011).

Further, in an embodiment, if a node on a given fully constructed ring has the identificatiuon number $x_{D-1}x_{D-2} \ldots x_1x_0$, with $x_i$ being a digit between 0 and d−1, and D denoting the number of the ring on which the given node is located, the node is allowed to route data packets on the same ring to all of its De Brujn neighbours, to the node with the identification number $0x_{D-2} \ldots x_1x_0$.

With such routing scheme, each network node includes a routing table with at most 2d+2 entries.

The invention further regards a method of routing data packets in a communication network between a source node and a destination node. The method discriminates between cases in which the source node and the destination node reside on the same or different rings.

If the destination node and the source node reside on the same ring, horizontally routing the data packets by left shifting is performed until the destination node is reached.

If the destination node resides on a ring outside the ring of the source node, a combination of horizontal routing and vertical in-out routing of the data packets is performed by first horizontally routing the data packets to a node with an identification number the first D digits of which are identical to the first D digits of the destination node, D denoting the ring number of the ring in which the source node is located, in-out-routing of the data packets from said node to a node on the next outer ring with an identification number the first D+1 digits of which are identical to the first D+1 digits of the destination node, and repeating such in-out-routing until the destination source is reached.

If the destination node resides on a ring inside the ring of the source node, a combination of vertical out-in routing and horizontal routing of the data packets is performed by first out-in-routing of the data packets from said source node to the neighbouring node on the next inner ring, repeating such out-in-routing until a node on the same ring as the destination node is reached, and then, horizontally routing the data packets by left shifting until the destination node is reached.

In one embodiment, the nodes on a fully constructed ring form a (d, D) De Brujn network wherein, if the destination node and the source node reside on the same ring, horizontal routing of the data packets is carried out to De Brujn neighbours.

The invention further regards a method of locating and securing data from a desired resource in a communication network. The method comprises the steps of assigning a resource at a specific node a global unique identifier (also referred to as GUIDE), assigning the resource at least one ambassador which contains the address and the global unique identifier of the specific node, choosing the ambassador with a method which is a function of the global unique identifier of the resource, calculating at a requesting node the identification number of an ambassador, routing data between the requesting node and the ambassador according to the routing method of claim 12, transferring data between the requesting node and the specific node.

For any recource, each node in the network has at least one and at most $D_{max}$ ambassadors in the network, where N≧d and the total number of rings forming the network is $D_{max}$.

The Global Unique IDEntifier (GUIDE) can, for example, be obtained by using the hashing of the resource's name. For the hashing itself, one can use the well-known SHA-1 function with additional strategies to avoid collision of GUIDEs.

In an embodiment, one ambassador is chosen on the same ring as the ring on which the specific node is located and one ambassador is chosen on the next inner ring, wherein an ambassador is assigned an identification number which is equal to the first D digits of the global unique identifier (GUIDE) of the recource, D denoting the number of the ring on which the ambassador is located. For example, if the global unique identifier of a recource is 112101001221 and the provider is located on the fourth ring with D=4, the ambassador has the identification number 1121.

In one embodiment, one additional ambassador is placed on each further outer ring as the network grows. As already mentioned, there are at most $D_{max}$ ambassadors in the network.

BRIEF DESCRIPTION OF THE DRAWINGS

The invention is explained in more detail below on the basis of exemplary embodiments with reference to the Figures, in which.

DETAILED DESCRIPTION

Figure 1:
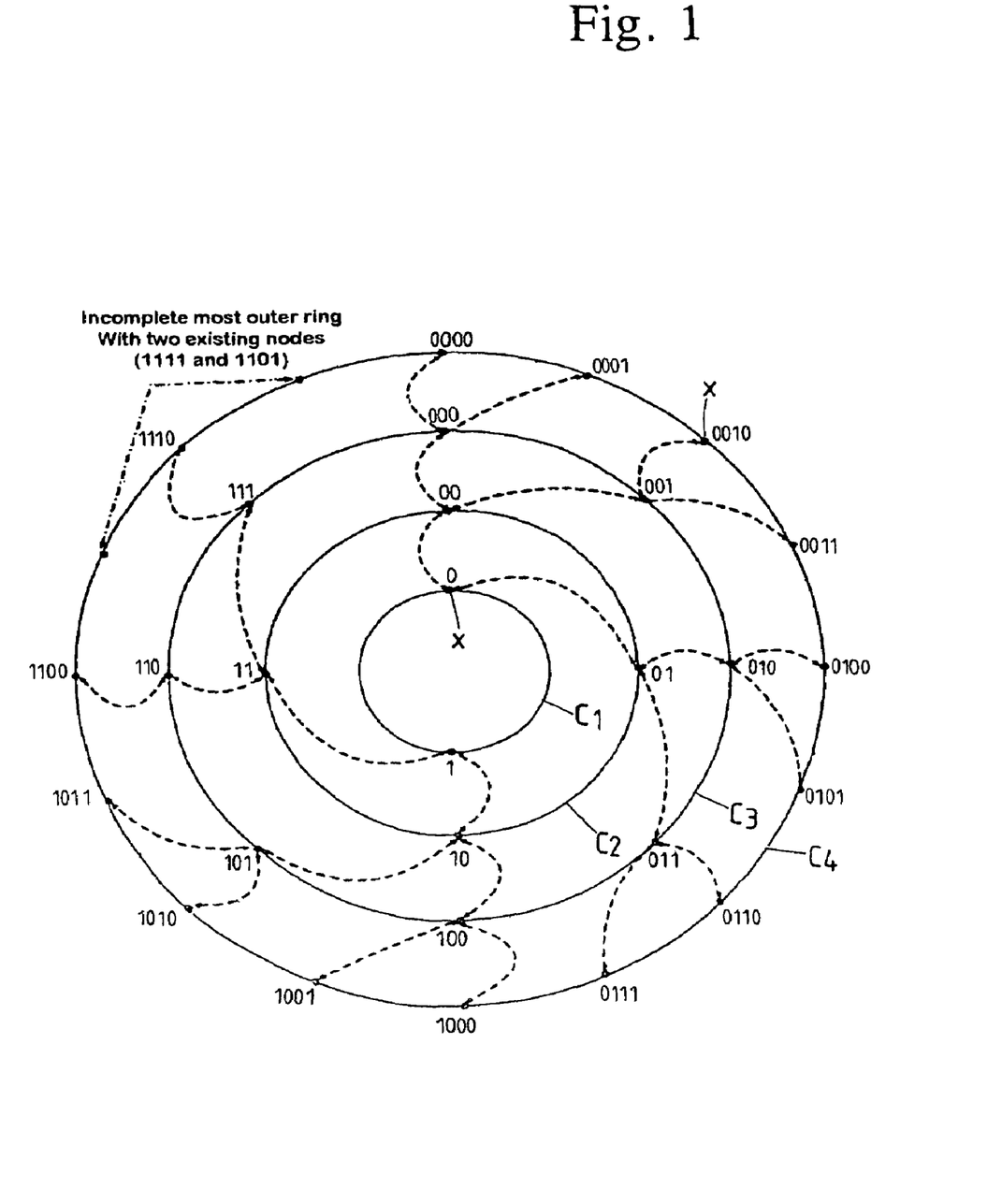
FIG. 1 shows a first example of a concentric multi-ring overlay (HiPeer) network with d=2.

FIG. 1 depicts a concentric multi-ring overlay network, which in the following is also referred to as a HiPeer network.

The term "overlay" network indicates that the network is a logical network. The following description refers to the logical arrangement of the nodes of the network.

According to FIG. 1, an exemplary network consists of 4 concentric rings $C_1$, $C_2$, $C_3$ and $C_4$, $C_4$ being the outermost ring. All rings except the outermost ring are with high probability fully constructed, i.e., fully occupied.

Each node x of the network is identified by an identification number (ID) unique in the network. The identification number has D digits, wherein D denotes the ring number on which the node is located. The value of each digit is between 0 and d−1, wherein d denotes the base of an integer having D digits (and also stands for the degree of the De Brujn network formed by a ring). In the exemplary network of FIG. 1, d is equal to 2. In the first ring (D=1), accordingly, the nodes have IDs with one digit 0 or 1, in the second ring (D=2), the nodes have IDs with two digits, each digit having the value 0 or 1, etc.

The number of nodes x on each fully constructed ring is equal to $d^D$.

Each node of a given fully constructed ring is allowed to route data packets to one node in the next inner ring, to d nodes in the next outer ring, if the next outer ring is fully constructed, and to at least d nodes on the same ring. For example, looking at node 001 on ring $C_3$, this node may route data to one node on ring $C_2$, namely node 00, and to d (d=2) nodes on ring $C_4$, namely nodes 0010 and 0011.

More generally, if a node x on a given fully constructed ring has the identification number $x_{D-1}x_{D-2}\ldots x_1x_0$, with $x_i$ being a digit between 0 and d−1, and D denoting the number of the ring on which the given node is located, the node is allowed to route data packets to the one node in the next inner ring (out-in-routing) which has the identicication number $x_{D-1}x_{D-2}\ldots x_1$. For example, if $x_{D-1}x_{D-2}\ldots x_1x_0$ is equal to 110, the node is allowed to route data packets to the one node in the next inner ring which has the ID $x_{D-1}x_{D-2}\ldots x_1$ which is 11.

Further, the node with identification number $x_{D-1}x_{D-2}\ldots x_1x_0$ is allowed to route data to those d nodes in the next outer ring (in-out-routing) which have the identification number $x_{D-1}x_{D-2}\ldots x_1x_0\beta$, wherein β is a digit between 0 and d−1. For example, where $x_{D-1}x_{D-2}\ldots x_1x_0$ is equal to 110, the node is allowed to route data packets to nodes in the next outer ring which have the IDs 1100 and 1101.

Routing within a given fully constructed ring may be carried out to the d De Brujn neighbours of a node. Also, routing within a ring may be carried out to the node with identification number $0x_{D-2}\ldots x_1x_0$. For example, the node $x_{D-1}x_{D-2}\ldots x_1x_0$ on ring $C_4$ (D=4) is node 1010. Such node may route data within ring $C_4$ to a) its De Brujn neighbours and b) to node 0010.

Figure 3:
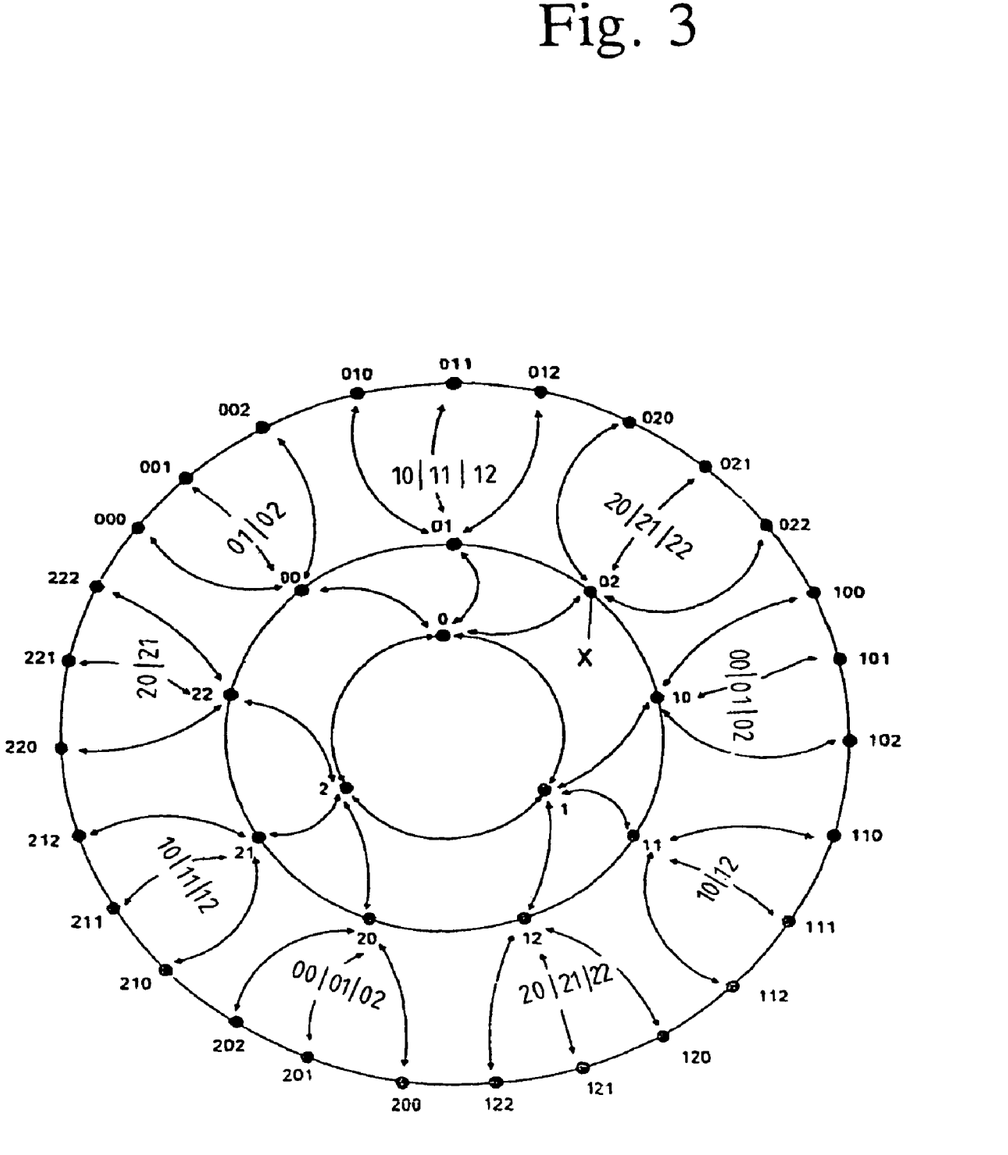
FIG. 3 shows a second example of a concentric multi-ring overlay (HiPeer) network with d=3.

FIG. 3 shows another example of an inventive HiPeer network, with d=3 and D=3 such that each node x has an identification number with digits 0, 1 or 2. There are d=3 links to nodes on the next outer ring. The organization of the network is the same as of the network of FIG. 1.

To give another example for routing in an inventive network, we consider a network with d=3 and a node having as ID 100100. The De Brujn neighbours are 001000, 001001 and 001002. Out-in-routing may be carried out to node 10010. In-out-routing may be carried out to nodes 1001000, 1001001 and 1001002. This is shown in the following diagram:

There exists a ring contact node in each ring which is always present as long as the ring exists. It is the first node of a new outermost ring. If a ring contact node leaves the network, it has to be replaced at once. The ring contact node represents a contact point for any node wishing to join the ring. In one embodiment, the ring contact node is assigned an identification number consisting of D digits of value zero, D denoting the ring number. Accordingly, in the example of FIG. 1, the ring contact node for ring $C_4$ has the ID 0000.

Figure 2:
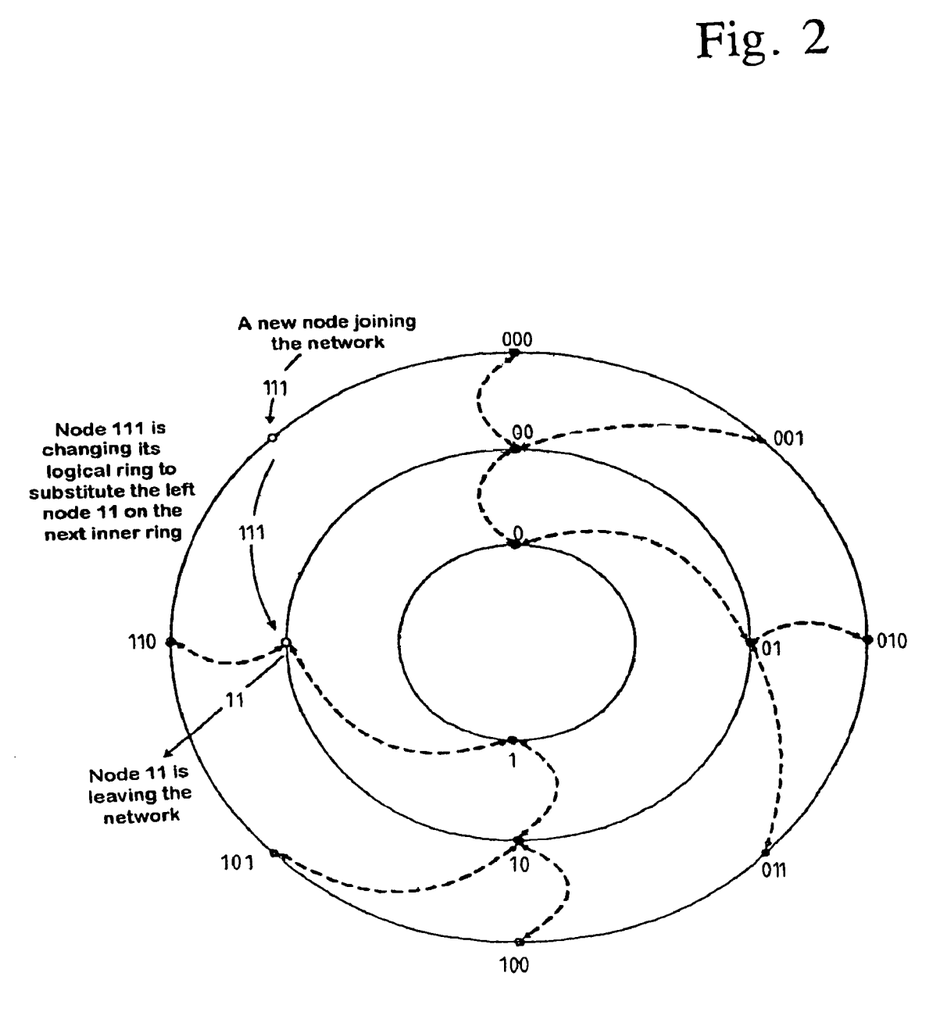
FIG. 2 shows the network of FIG. 1 in a situation when nodes leave and join the network.
Figure 4:
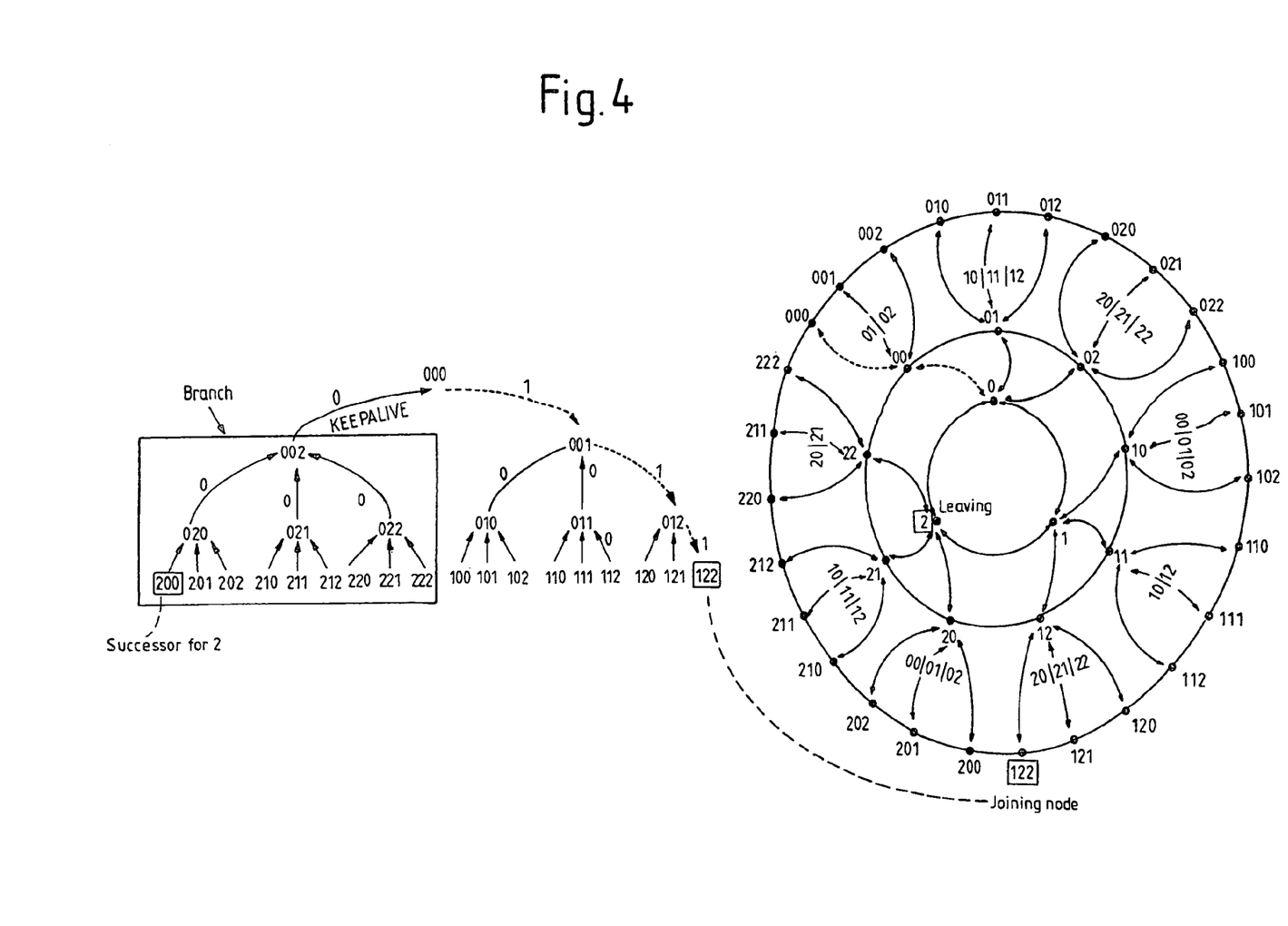
FIG. 4 shows the network of FIG. 3 in a situation when nodes leave and join the network.

FIGS. 2 and 4 show situations in which nodes join and leave the network. In the course of rearrangement of the logical network, some nodes may change their logical ring. The intention is to reorganize the network such that all rings but the outermost ring are fully constructed.

In the following, partly repetitive of what has already been said, different aspects of the invention are discussed in subchapters regarding network construction, recource distribution, routing scheme, recource lookup and network maintenance. The description ends with a chapter on simulation results.

Network Construction

Five construction rules are identified that allow to build and maintain a network as described in FIGS. 1 and 3.

First, it is introduced the notion of a ring identifier, abbreviated RID, which is equal to the function $ring(x)=D_x$ for the node x. The RID defines the identifier of the ring, whereon a node x is located in the concentric multi-ring topology.

The network is constructed and maintained progressively as nodes join and leave the system. The gradually network construction obey the following construction rules:

Construction rule 1: The rings are so constructed that nodes on a given inner ring can form a (d, D) De Bruijn network.

In order to exploit the routing properties of the De Bruijn digraphs with optimal routing path length $D=\log_d N$, this construction rule ensure that resource lookup in the network is achieved in at most D hops, where N is the total number of nodes on the ring.

The logical concentric multi-ring representation is conceived with the idea that the nodes on the inner rings are more reliable than nodes on the outer ones during the gradual network expansion. Moreover, the concentric multi-ring topology can also allow routing in multiple directions (i.e. multi-dimensional routing: consider a multi-dimensional 3D or 4D or xD representation of the model, which add new surface for trajectories along the routing path; in the sequel, we consider only "flat" (2 dimensional: 2D) multi-ring topologies), which improves flexibility and reliability in the case of nodes' failure.

Construction rule 2: When a node leaves, a stabilization routine is started on a finite portion of the network, whereby some nodes may change their logical ring and thus their status in the concentric multi-ring topology.

Possibles algorithms for the management of node's "join or leave" in the network based on the logical multi-ring topology are discussed further below. FIG. 2 gives an illustration of the HiPeer's concentric multi-ring overlay networking in the state of a node's joining and leaving the network (2D case).

Construction rule 3: When a new node joins the network and the most outer ring with RID D already has $d^D$ nodes, a new ring with RID D+1 is created.

The network can grow as necessary, there is no upper limit for the maximum number of nodes and hence rings in the network.

Construction rule 4: The ring's construction begins always with the node $x_{\{init,D\}}$ with the lowest identifier on the ring and the node $x_{\{init,D\}}$ is present as long as the ring with RID D exists. $x_{\{init,D\}}=00\ldots000$, where $|x_{\{init,D\}}|=D$.

As nodes join the network progressively, the rings are gradually filled. The first ring consists of at most $d^1$ nodes, the second ring contains at most $d^2$ nodes and so the $k^{th}$ ring contains $d^k$ nodes.

It is pointed out that the total number of nodes in the network is at most $N_{max}=(d^{D+1}-d)/(d-1)$, with $d>1$.

To ensure consistency and an uniform distribution of keys between the nodes on the ring, it further stipulated the following fifth construction rule.

Construction rule 5: If a ring with RID D exists, then the node with identifier $x_{\{init,D\}}$ always exists on that ring.

Node $x_{\{init,D\}}$ plays the role of ring's contact point during the join operation and ensures a balanced distribution of existing nodes on the ring, by performing key space halving as described below.

With the construction of the multi-ring network having been described, the following discussion focuses on recource distribution and discovery in such network.

Recource Distribution

Resource distribution defines how keys are distributed among the peers in the network. As described, each node has an ID whose length (number of digits) is associated with the ring identifier. As it is the case in a physical network, each node in the logical overlay network can hold more than one resource. Each resource is assigned a Global Unique IDentifier (GUIDE), which can for example be obtained by using the hashing of the resource's name. For the hashing itself, one can use the well-known SHA-1 function with additional strategies to avoid collision of GUIDEs. The GUIDE of a resource can be of arbitrary length: e.g., the resource with GUIDE $R_x=r_{i-1}\ldots r_o$ provided by the node x is a d-base integer with length i=160 bits for d=2 in the case of SHA-1 hashing.

Each node x can place information about its resource $R_x$ of length L at any node y on the same ring and on any node y on the next inner ring which is assigned an identification number which is equal to the first D digits of the global unique identifier (GUIDE) of the recource, D denoting the number of the ring on which the other node y is located. As the network grows, the resource placement is extended to all nodes y on the outer rings for which the identification number is equal to the first D digits of the global unique identifier (GUIDE) of the recource, D denoting the respective ring number. In the following, such node y is referred as the ambassador of x for resource $R_x$ in the network.

It is thus possible to identify an ambassador for a required recource in a simple and transparent manner, wherein the determination of an ambassador can be carried out at each node.

For any resource R, each node in the network has at least 1 and at most $D_{max}$ ambassadors in the network, where $N \geq d$ and the total number of rings forming the network is $D_{max}$. Hence, any node x has at most $D_{max}$ ambassadors in the network.

Routing Scheme

The following four routing rules have already been discussed above, for what reason they are simply repeated here.

1. Node x on ring $D_x$ can route to at most d nodes on the next outer ring with RID $D_x+1$; these are all nodes $y=x_{D-1}x_{D-2} \ldots x_1 x_{0\beta}$, wherein $\beta$ is a digit between 0 and d−1, when this outer ring is fully constructed.

2. Node x can route to a node $y=x_{D-1}x_{D-2} \ldots x_1$ on the inner ring.

3. Node x can route to at most d nodes y on the same ring; these are all its De Bruijn neighbors.

4. Node x can route to at most 1 nodes y, with $y=0x_{D-2} \ldots x_1 x_0$. If x is ring contact node, then y is the ring contact node of the next inner ring.

It follows that each node in the network has a constant degree of at most 2d+2, which is independent of the network size.

Figure 5:
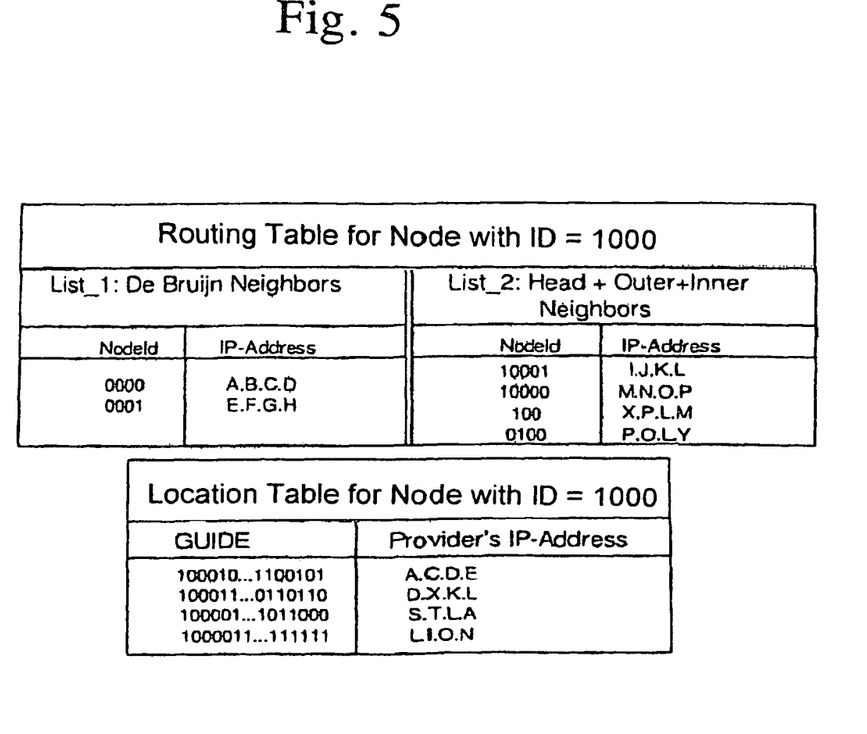
FIG. 5 shows an exemplary routing table and a location table of node with ID 1000 of the network of FIG. 1.

Each node x in the network maintains at most 2 tables, as is shown in FIG. 5 for the node with ID 1000.

1. A routing table with a List_1 of pairs (NodeID, IP Address) for maintaining information about the De Bruijn neighbors and a List-2 of pairs (NodeID, IP Address) for maintaining information about the closest head node and the outer and inner neighbors.

2. A resource location table with the list of pairs (GUIDE, Provider's IP Address) that contains the list of the resource providers for any resource R of length L wherein the identification number of a recource provider is equal to the first D digits of the global unique identifier (GUIDE) of the recource.

It is pointed out that each ring with identifier $RID \leq D_{max}-1$ is with high probability (w.h.p.) always fully constructed, with the ring capacity $N=d^D$. This mainly follows from the two construction rules 2 and 3. According to these rules, the only ring with the eventual incomplete ID space is the outermost one with $RID=D_{max}$. When the stabilization routine is processed, an inner ring could be in an incomplete state. However, if the stabilization routine takes an extremely short time T to resume its task, then any inner ring is always fully constructed w.h.p.

As an immediate consequence of this, and of the routing rules above, the De Bruijn routing principles can be used as basis for routing between the nodes on the same ring; this is what is called horizontal routing.

Figure 6:
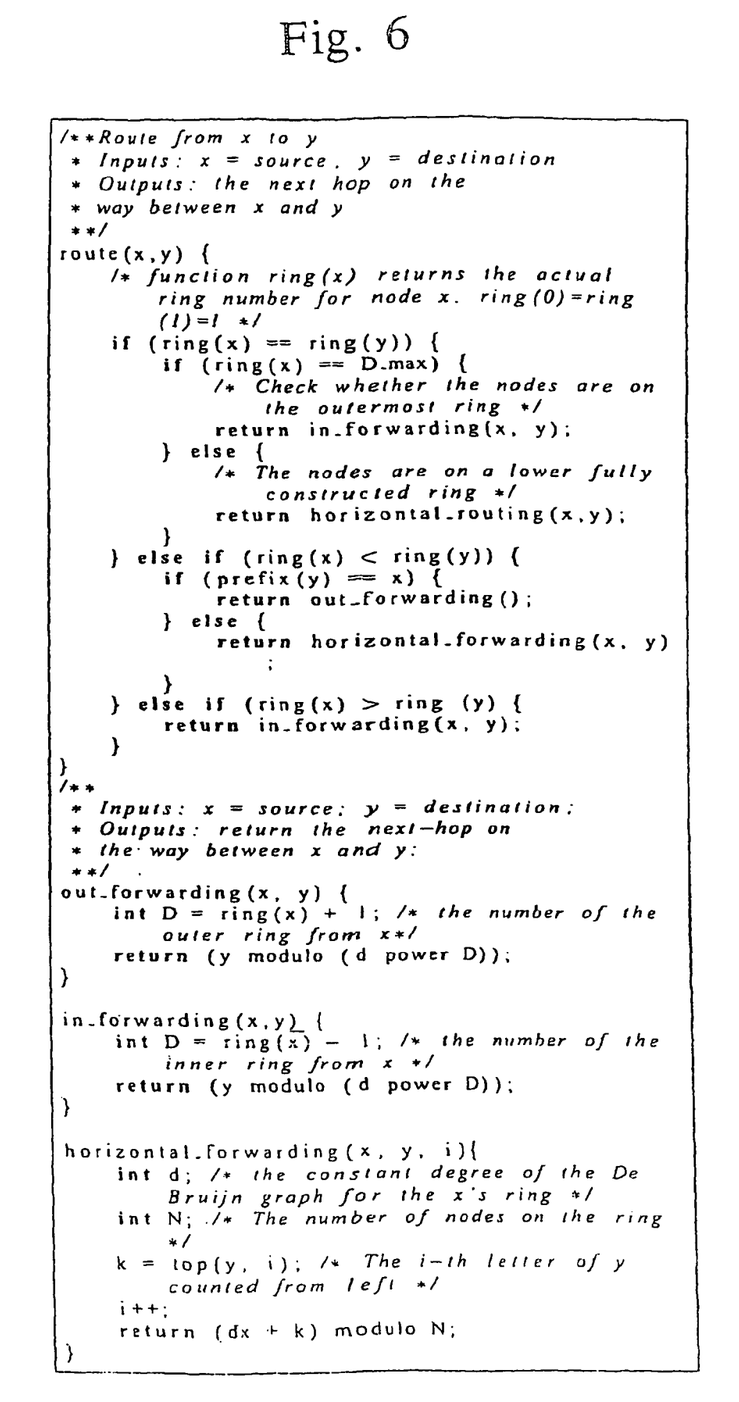
FIG. 6 shows a routing algorithm for routing data packets in a concentric multi-ring overlay (HiPeer) network.

Routing operations between any two nodes from x to y in the network consist of three methods as shown in FIG. 6. The routing operation is sketched out in the following phases:

If the destination node y and the source node x reside on the same ring, horizontally routing of the data packets to the De Brujn neighbours on the same ring is performed by left shifting until the destination node is reached.

If the destination node y resides on a ring outside the ring of the source node x, a combination of horizontal routing and vertical in-out routing of the data packets is performed by first horizontally routing the data packets to a node with an identification number the first D digits of which are identical to the first D digits of the destination node, D denoting the ring number of the ring in which the source node is located, in-out-routing of the data packets from said node to a node on the next outer ring with an identification number the first D+1 digits of which are identical to the first D+1 digits of the destination node, and repeating such in-out-routing until the destination source is reached, If the destination node y resides on a ring inside the ring of the source node x, a combination of vertical out-in routing and horizontal routing of the data packets is performed by first out-in-routing of the data packets from said source node to the neighbouring node on the next inner ring, repeating such out-in-routing until a node on the same ring as the destination node is reached, then, horizontally routing the data packets by left shifting until the destination node is reached.

A special case is when a message is routed between two nodes x and y on the outermost ring of the network; node x forwards the message through vertical out-in routing in one hop to the node on the next inner ring. That node horizontally forwards the message to its neighbors till the node is reached that can vertically forward the message in one hop to the destination node y on the outer ring.

Therefore, forwarding from one node on the outermost eventually incomplete ring to another node on the same ring can be done with a routing path of length $D_{HiPeer}+1$. There is ongoing study to improve this value to at most $D_{HiPeer}$ or better.

Accordingly, routing between any two nodes in the network can be achieved in at most $D_{HiPeer}+1$ hops.

Resource Lookup Scheme

As resources are always distributed from the inner to the outer ring, a node x looking for a resource $R_y$ of length L always first sends its resource discovery request horizontally to the node on the same ring the first digits of which are identical to an ambassador's first digits (an ambassador is calculated as stated above). With high probability, such node knows a provider of $R_y$. Such node uses the "out_forwarding" routine to forward the request until a possible node y (ambassador) is reached that knows the provider of the resource $R_y$.

Resource lookup in the network can find an ambassador of the resource provider in at most $D_{HiPeer}$ hops.

The following is an example of a recource lookup. If node Y=21 desires resource R=112101001221, the following lookup scheme is carried out:

Network Maintenance

This section highlights the fact that the concentric multi-ring topology sets the basis for an efficient network maintenance during network churn. It shows that, for any node joining or leaving the network, the constant network maintenance cost is of order 0(d).

The Case of JOIN: Before initiating the first contact with the network, a requirement is that the node knows the IP-address of a node in the network, the so-called "contact node". This can be achieved by, e.g. choosing the node with a given ID=0, which can be set for example to be always alive and widely known in the system.

Generally, when a new node wants to join the network, it should: (i) determine the RID of the actual outermost ring and (ii) choose a node's identifier (ID) on that ring. The outermost ring of the concentric multi-ring overlay is considered as the network entry point. To determine the actual outermost ring of the network, the newcomer node x will send a "join request" message to the contact node, asking for the attribution of an ID on the actual outermost ring. According to the construction rule 5, all nodes $x_{\{init,k\}}$, k from $\{1, \ldots, D\}$, play the role of a ring contact node, so that the "join request" message is routed to $x_{\{init,D\}}$ on the outermost ring. If the outermost ring is full, then a new outer ring is created and x becomes the node $x_{\{init,Dmax+1\}}$ on that ring, else the newcomer is attributed an identifier in the middle of the next larger space on the outermost ring. Hence, the operation of determining the actual outermost ring can involve at most $D_{HiPeer}$ nodes to forward the "join request" message.

To ensure an even distribution of keys at all times in the system, the distance between any two neighboring nodes on the rings must be as equal as possible. Hence, the newcomer node in the outermost ring divides the current largest space between any two nodes in two spaces of equal size. E.g., if a node x joins the network as indicated in FIG. 4, it divides the space between the nodes 110 and 000 into two equidistant spaces and becomes the node with ID 111.

After joining the system, and in order to build its own view of the system, the newcomer node should notify its presence to its neighbors, distribute its re-sources, and collect notification messages received from others nodes. After that, the node is connected and it can request and exchange resources with the rest of the network.

The HiPeer network overlay allows with each node joining the network a generation of one message to determine the RID of the outermost ring, plus one resource location message to distribute each of its resources, plus at most d+1 messages to update its routing table. This makes a total constant number of d+3 messages, which involves at most D nodes for forwarding.

The Case of LEAVE: A node x leaving the network on a fully constructed inner ring in the concentric multi-ring overlay should be replaced by another to ensure network consistency. Therefore, the departure of x from the network triggers a reorganization procedure in order to maintain an up-to-date overview of resources availability in the network; hence, nodes can notify their ambassadors about the intention to leave in the manner of the WARAAN protocol and choose a successor to inherit their ID on the ring, to ensure that the ring is always fully constructed.

For the successor selection operation, node x should not need more than one message to choose one of its neighbors to take its place in the system. Subsequently, the leaving node sends its tables to its successor and leaves the network.

Since resource distribution is done in a deterministic fashion, node x can also send a "delete notification" to all its ambassadors in the network for any of its resources. However, as the number of resources at each node can be large and the resource placement is really distributed, sending "delete notification" to all the ambassadors can be a costly operation. Thus, this can be chosen as an optional alternative with interesting properties in a sparsely populated network.

After a node x has communicated its tables to its successor, it leaves the network and the successor node changes its logical ring to become the new node with ID x. The new node x differs from the old one in two points, the IP address and the provided resources. The new node with ID x has the routing and the location tables of the old node x. For consistency reasons, once being present on the new ring, the successor publishes its resources to ambassadors on the same ring and on the next inner ring and updates the routing entries of its De Bruijn neighbors. This operation implies a network maintenance cost of mostly d+2 messages for each node leaving the network.

In summary, for the nodes joining and leaving the network, maintenance operations to ensure a persistent validity of the construction rules does not exceed a constant cost of order O(d).

Simulation Results

This section is to demonstrate the qualities of the HiPeer network and protocol on the basis of simulation results. The performance evaluation is given for standard conditions in a network with minimal packet loss and less congestion.

As to simulation setup, the network consists of good nodes (normal nodes, participating in the network to download and upload files) and malicious nodes (adversarial nodes, participating in the network to undermine its performance). It were analyzed different behaviors of a malicious peer in a network using threat models. It is further assumed that any normal node joining the network first builds its routing and location table and then chooses ambassadors for its resources in the network.

During the first simulation one joins the network each five seconds until the number N of nodes in the network is 1192, which means that the network is fully constructed with 6 rings. During the network is growing, nodes in the network regularly request existing resources in the network. It is simulated the lookup path length, which is the number of peers that a request message visits before reaching a valid resource provider or a valid ambassador of the requested resource. It is also simulated the routing table size per node, when the number of nodes in the network grows exponentially. The other simulation evaluates the load balancing of the protocol by simulating the number of resources per nodes. The following results were achieved.

Lookup Path Length: The principle is to find a provider or an ambassador of a resource in the network. The nodes regularly request an existing resource in the growing network by sending lookup request messages. It was found that there is no lookup failure in the network as long as there is no node failure in the network.

Figure 7A:
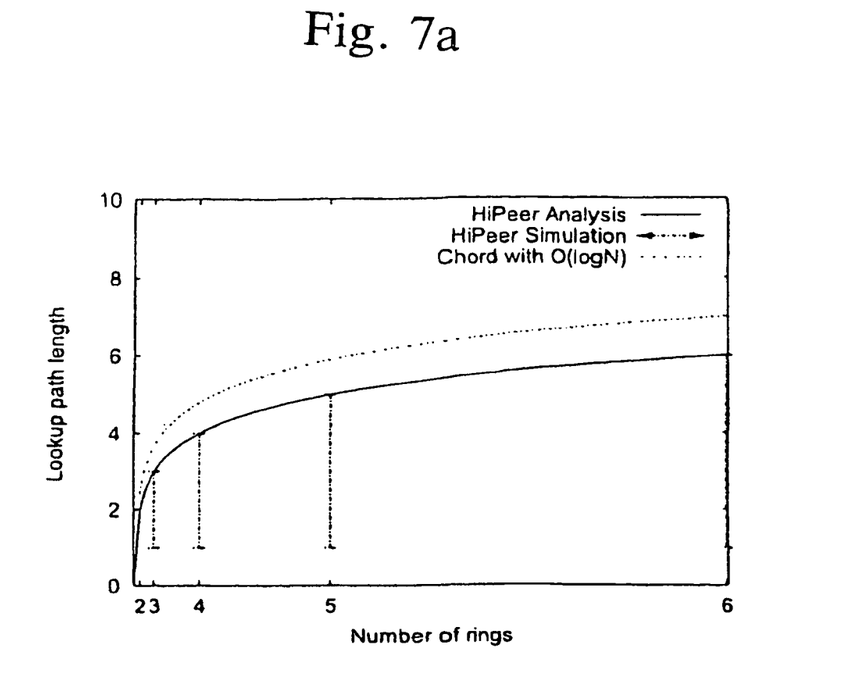
FIG. 7*a* shows the min-max lookup path length in a concentric multi-ring overlay (HiPeer) network with degree d=3 in a fully constructed network as a function of the number of concentric ring in a simulation.
Figure 7B:
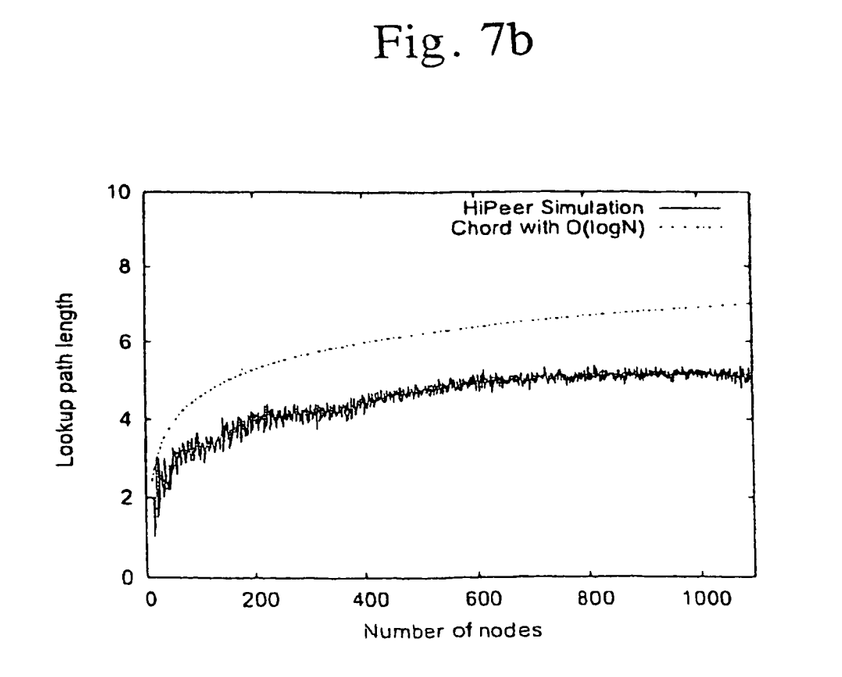
FIG. 7*b* shows the average lookup path length in a gradually growing concentric multi-ring overlay (HiPeer) network with degree d=3 as a function of the number of nodes in the network in a simulation.

FIG. 7a shows that when the network is fully constructed the lookup path length is not longer than $D_{Hipeer} = \log_d(N(d-1)+d)-1$. In FIG. 7b, it is shown a comparison result of the average path length with the path length in the known Chord protocol; this simulation result shows that resources in a HiPeer based network can be reached within a shortest path length than e.g. in Chord.

Figure 8:
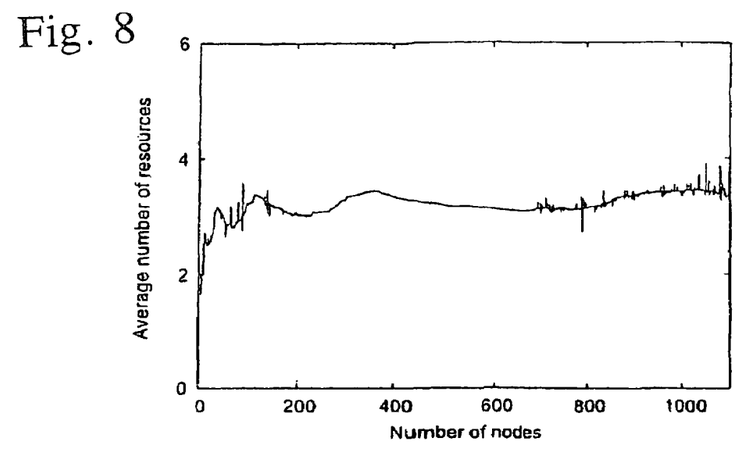
FIG. 8 shows the average number of recources stored per node in a concentric multi-ring overlay (HiPeer) network with about 1200 nodes in a simulation.

Load Balancing: An important assessment factor that shows the strength of the HiPeer protocol is the load balancing of the system. Following the P2P philosophy, it is important that the nodes in the network have almost the same responsibility of maintaining the network. It is indicated in FIG. 8 that available resources are fairly distributed between nodes in the network. This is, when a new node joins the network with some new resources, they are distributed so that no node is overwhelmed when an other one has less ambassador duty. The FIG. 8 shows that the average distribution of resources per node is almost constant at any size of the network. This is possible because new nodes joining the network distribute its resources only to the virtually local nodes on the same ring and on the next inner ring.

Figure 9:
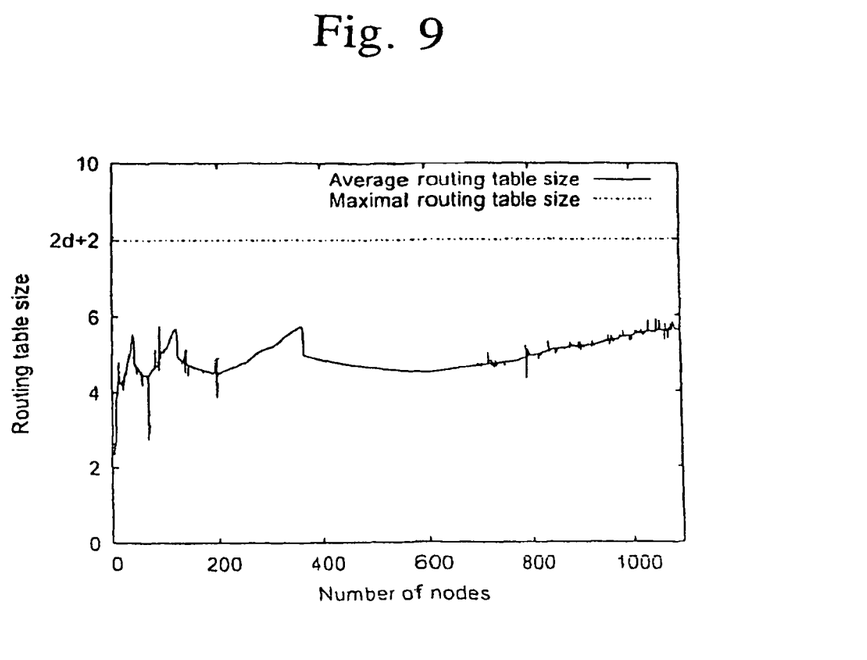
FIG. 9 shows the average number of routing table entries per node as a function of the network size in a simulation.

Routing Table Size: Generally, ensuring a good connectivity of the nodes and hence of resources in the network implies that nodes are aware of a great amount of nodes in the network. So, as the network grows, the routing table in most known protocols logarithmically grows with the number of nodes in the network. In the present HiPeer network, the routing table is limited to 2d+2 independently of the number of nodes in the network. FIG. 9 presents the evolution of the mean routing size per node in a network growing from 0 to 1092 (where 1092 is the number of nodes in a fully constructed network with 6 concentric rings).

The invention is not restricted in its configuration to the exemplary embodiments presented above, which are to be understood as only given by way of example. A person skilled in the art recognizes the existence of numerous alternative variants for the embodiment, which, in spite of their departure from the exemplary embodiments described, make use of the teaching defined in the claims.

The invention claimed is:

1. A communication network comprising a plurality of network nodes; wherein
   the network nodes are logically arranged to form a plurality of concentric rings, all rings except the outermost ring being fully constructed;
   the number of nodes on each fully constructed ring being $d^D$, wherein d denotes the base of an integer having D digits, D>1, and wherein D also denotes the ring number, D starting with the value 1 for the innermost ring;
   each node being identified by an identification number unique in the network, said identification number having D digits, D>1, and D denoting the ring number on which the node is located, and the value of each digit being between 0 and d-1; and
   each node of a given fully constructed ring is allowed to route data packets:
       to one node in the next inner ring,
       to d nodes in the next outer ring, if the next outer ring is fully constructed,
       to at least d nodes on the same ring.

2. The network according to claim 1, each ring being logically so constructed that the nodes on a fully constructed ring form a (d, D) De Bruijn network.

3. The network according to claim 1, further comprising computing means initiating a stabilization routine on a finite portion of the network when a node on an inner ring leaves the network, the stabilization routine logically rearranging some of the nodes such that they change their logical ring in a manner that, at the end of the routine, all rings except the outermost ring are fully constructed again.

4. The network according to claim 1, further comprising computing means placing a node joining the network on the outermost ring and assigning a unique identification number, and, if the outermost ring is already fully constructed, creating a new outermost ring and placing the joining node on the new outermost ring.

5. The network according to claim 4, wherein a node joining the network divides the current largest space between any two nodes in the outermost ring in two spaces of equal size.

6. The network according to claim 1, wherein the first node of a new outermost ring is assigned an identification number consisting of $D_{MAX}$ digits of value zero, $D_{MAX} \geq 1$, and $D_{MAX}$ denoting the ring number of the outermost ring, said first node representing a ring contact node.

7. The network according to claim 6, wherein said ring contact node of a new outermost ring is present as long as this ring is present.

8. The network according to claim 7, wherein said ring contact node of a new outermost ring represents a contact point for any node wishing to join the network.

9. The network according to claim 1, wherein, if a node on a given fully constructed ring has the identification number $X_{D-1}X_{D-2}\ldots x_1x_0$, with $x_1$ being a digit between 0 and d-1, and D denoting the number of the ring on which the given node is located, the node is allowed to route data packets to
   the one node in the next inner ring which has the identification number $X_{D-1}X_{D-2}\ldots x_1$ i.e. the node in the next inner ring which is identical in its first D-1 digits,
   those d nodes in the next outer ring which have the identification number $X_{D-1}X_{D-2}\ldots x_1x_0\beta$, wherein $\beta$ is a digit between 0 and d-1, i.e. to nodes on the next outer ring which are identical in their first D digits.

10. The network according to claim 2, wherein, if a node on a given fully constructed ring has the identification number $X_{D-1}X_{D-2}\ldots x_1x_0$, with $x_1$ being a digit between 0 and d-1, and D denoting the number of the ring on which the given node is located, the node is allowed to route data packets on the same ring
    to all of its De Bruijn neighbors;
    to the node with the identification number $0x_{D-2}\ldots x_1x_0$.

11. The network according to claim 9, wherein each network node includes a routing table with at most 2d+2 entries.

12. A method of routing data packets between a source node and a destination node in a communication network in which the network nodes are logically arranged to form a plurality of concentric rings, the method comprising the steps of:
    if the destination node and the source node reside on the same ring, horizontally routing the data packets by left shifting until the destination node is reached,
    if the destination node resides on a ring outside the ring of the source node, performing a combination of horizontal routing and vertical in-out routing of the data packets by
        first horizontally routing the data packets to a node with an identification number the first D digits of which are identical to the first D digits of the destination node, D denoting the ring number of the ring in which the source node is located,
        in-out-routing of the data packets from said node to a node on the next outer ring with an identification number the first D+1 digits of which are identical to the first D+1 digits of the destination node,
        repeating such in-out-routing until the destination source is reached,
    if the destination node resides on a ring inside the ring of the source node, performing a combination of vertical out-in routing and horizontal routing of the data packets by
        first out-in-routing of the data packets from said source node to the neighboring node on the next inner ring,
        repeating such out-in-routing until a node on the same ring as the destination node is reached,
        then, horizontally routing the data packets by left shifting until the destination node is reached.

13. The method of claim 12, wherein the nodes on a fully constructed ring form a (d, D) De Bruijn network and wherein, if the destination node and the source node reside on the same ring, horizontal routing the data packets is carried out to De Bruijn neighbors.

14. A method of locating and securing data of a desired resource in a communication network comprising a plurality of network nodes; wherein the network nodes are logically arranged to form a plurality of concentric rings, all rings except the outermost ring being fully constructed;

the number of nodes on each fully constructed ring being $d^D$, wherein d denotes the base of an integer having D digits $D \geq 1$, and wherein D also denotes the ring number, D starting with the value 1 for the innermost ring;

each node being identified by an identification number unique in the network, said identification number having D digits, $D \geq 1$, and D denoting the ring number on which the node is located, and the value of each digit being between 0 and d-1; and each node of a given fully constructed ring is allowed to route data packets
- to one node in the next inner ring;
- to d nodes in the next outer ring, if the next outer ring is fully constructed;
- to at least d nodes on the same ring, comprising the steps of:

assigning a resource ($R_x$) at a specific node ($X_R$) a global unique identifier (GUIDE), assigning the resource ($R_x$) at least one ambassador which contains the address and the global unique identifier of the specific node ($X_R$), choosing the ambassador with a method which is a function of the global unique identifier (GUIDE) of the resource, calculating at a requesting node the identification number of an ambassador, routing data packets between the requesting node and the ambassador comprising the steps of:

if the destination node and the source node reside on the same ring, horizontally routing the data packets by left shifting until the destination node is reached, if the destination node resides on a ring outside the ring of the source node, performing a combination of horizontal routing and vertical in-out routing of the data packets by first horizontally routing the data packets to a node with an identification number the first D digits of which are identical to the first D digits of the destination node, D denoting the ring number of the ring in which the source node is located, in-out-routing of the data packets from said node to a node on the next outer ring with an identification number the first D+1 digits of which are identical to the first D+1 digits of the destination node, repeating such in-out-routing until the destination source is reached, if the destination node resides on a ring inside the ring of the source node, performing a combination of vertical out-in routing and horizontal routing of the data packets by first out-in-routing of the data packets from said source node to the neighboring node on the next inner ring, repeating such out-in-routing until a node on the same ring as the destination node is reached, then, horizontally routing the data packets by left shifting until the destination node is reached, transferring data between the requesting node and the specific node ($X_R$).

15. The method of claim 14, in which one ambassador is chosen on the same ring as the ring on which the specific node is located and one ambassador is chosen on the next inner ring, wherein an ambassador is assigned an identification number which is equal to the first D digits of the global unique identifier (GUIDE) of the resource, D denoting the number of the ring on which the ambassador is located.

16. The method of claim 15, wherein one additional ambassador is placed on each farther outer ring as the network grows.

17. The network according to claim 10, wherein each network node includes a routing table with at most 2d+2 entries.

* * * * *

UNITED STATES PATENT AND TRADEMARK OFFICE
CERTIFICATE OF CORRECTION

PATENT NO. : 7,660,320 B2  Page 1 of 1
APPLICATION NO. : 11/989452
DATED : February 9, 2010
INVENTOR(S) : Gissard Wepiwe et al.

It is certified that error appears in the above-identified patent and that said Letters Patent is hereby corrected as shown below:

In the Claims

| | |
|---|---|
| Column 15, Claim 14, lines 34, 36, 37 | Delete "destination" Insert -- requesting -- |
| Column 15, Claim 14, lines 34, 38 | Delete "source node" Insert -- ambassador -- |
| Column 16, Claim 14, lines 3, 9, 10, 12, 19, 21 | Delete "destination" Insert -- requesting -- |
| Column 16, Claim 14, lines 5, 13, 16, 17 | Delete "source node" Insert -- ambassador -- |

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

PATENT NO.         : 7,660,320 B2
APPLICATION NO.    : 11/989452
DATED              : February 9, 2010
INVENTOR(S)        : Giscard Wepiwe et al.

It is certified that error appears in the above-identified patent and that said Letters Patent is hereby corrected as shown below:

In the Claims

| | |
|---|---|
| Column 15, Claim 14, lines 34, 36, 37 | Delete "destination" Insert -- requesting -- |
| Column 15, Claim 14, lines 34, 38 | Delete "source node" Insert -- ambassador -- |
| Column 16, Claim 14, lines 3, 9, 10, 12, 19, 21 | Delete "destination" Insert -- requesting -- |
| Column 16, Claim 14, lines 5, 13, 16, 17 | Delete "source node" Insert -- ambassador -- |

This certificate supersedes the Certificate of Correction issued November 16, 2010.

Signed and Sealed this
Fourteenth Day of February, 2012

David J. Kappos
*Director of the United States Patent and Trademark Office*